Figure 1:
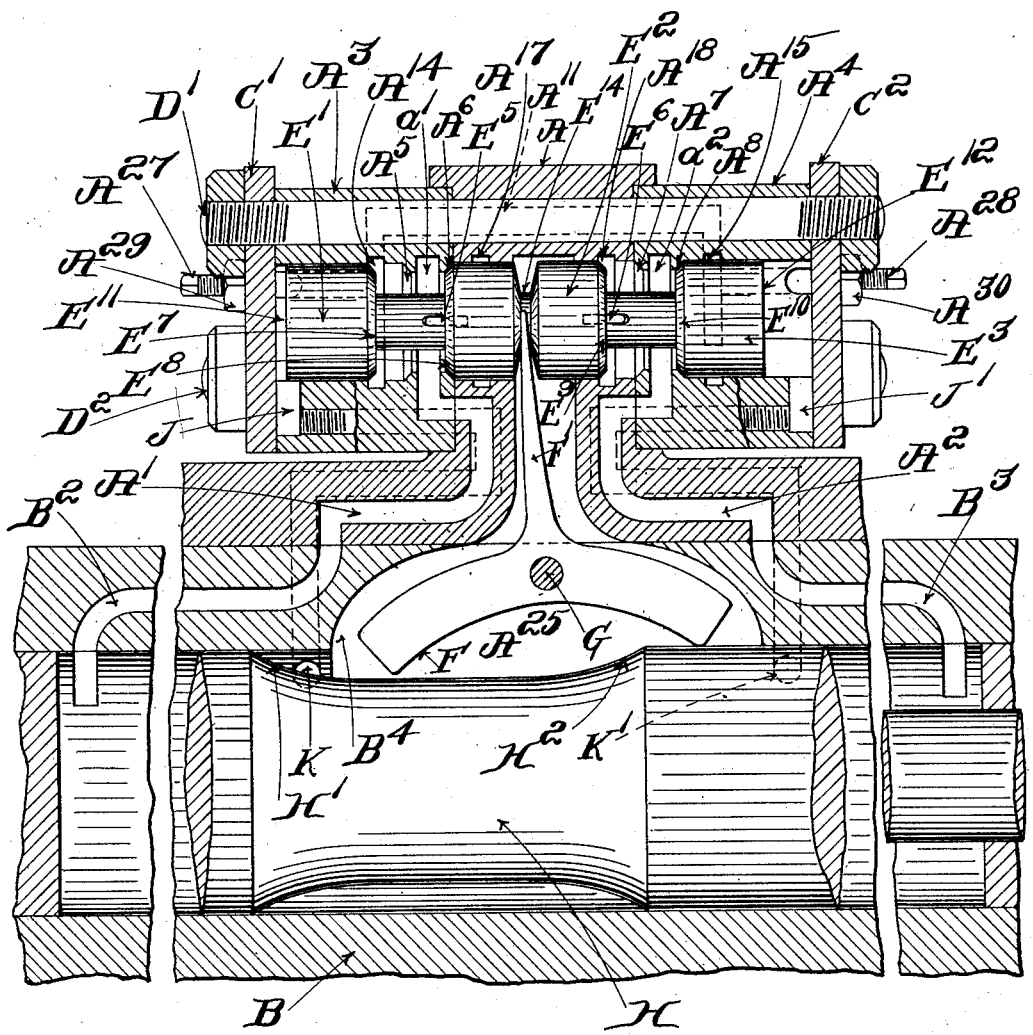

G. L. BADGER.
DIRECT ACTING ENGINE.
APPLICATION FILED JUNE 21, 1907.

998,563.

Patented July 18, 1911.
2 SHEETS—SHEET 1.

Witnesses:
John H. Parker
Almie Tarr

Inventor:
George L. Badger
by Macleod, Calver, Copeland & Dike
Attorneys.

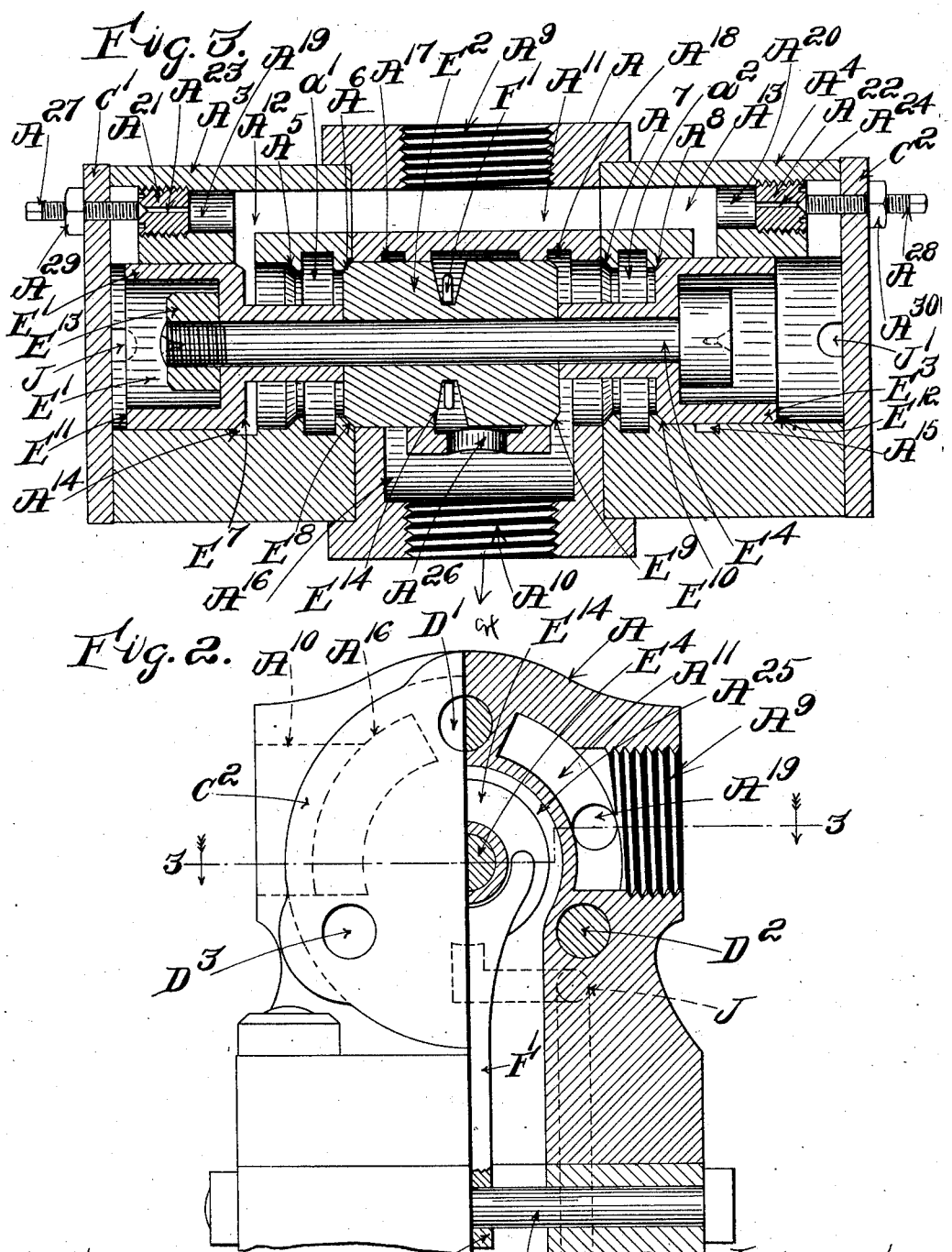

UNITED STATES PATENT OFFICE.

GEORGE L. BADGER, OF QUINCY, MASSACHUSETTS.

DIRECT-ACTING ENGINE.

998,563.  Specification of Letters Patent.  Patented July 18, 1911.

Application filed June 21, 1907. Serial No. 380,058.

*To all whom it may concern:*

Be it known that I, GEORGE L. BADGER, citizen of the United States, residing at Quincy, in the county of Norfolk, State of Massachusetts, have invented a certain new and useful Improvement in Direct-Acting Engines, of which the following is a specification, reference being had therein to the accompanying drawings.

This invention relates to improvements in direct acting engines and for illustration is shown in the accompanying drawings as applied to a rock drill, although the invention is applicable to various other purposes and other types of engines.

The principal objects of the invention are to provide a piston valve which will prevent leak or waste of motive fluid past the surfaces which close or seal the admission and exhaust ports and which is adapted to be wholly or partially actuated by fluid pressure, and also adapted to be wholly or in part mechanically operated.

A further object is to provide improved means for mechanically operating the valve which will move the latter very rapidly from one position to the other independent of the speed at which the piston may be moving.

In apparatus of this character as is well known the stroke of the piston is variable, depending to a great extent upon the speed at which the piston is moving, the momentum of the piston and other moving parts connected thereto carrying the piston beyond the point in the stroke at which the valve shifts to admit fluid to move the piston in the opposite direction. In some instances it is desirable to obtain as great a variation in the length of stroke as possible, while in other cases it is desirable to maintain the length of stroke approximately uniform at varying speeds. To accomplish the latter result it is necessary to avoid a dead point in the stroke in order to prevent the piston from stopping altogether when it is moving slowly.

Fluid actuated valves whose movement is independent of, but controlled by, the movements of the piston are largely employed in apparatus of this character. The supply of fluid for actuating the valves is sometimes controlled directly by the piston, the latter acting as a valve to alternately open and close ports in the walls of the cylinder leading to the valve. Although this is the simplest manner of controlling the valve, it is not desirable in every instance to employ a piston as long as is required to operate the valve in this manner, and the method has the disadvantage that as the cylinder and piston wear and allow the fluid to leak past the bearing surfaces the action of the valves becomes sluggish and irregular. To overcome the objections above mentioned an auxiliary valve is sometimes employed, which is positively actuated or controlled by the movements of the piston, the movement of the auxiliary valve controlling the ports leading respectively to opposite ends of the main valve to actuate the latter.

With the novel valve herein shown and described I am enabled to obtain the advantages of positively actuated valves and the flexibility of fluid actuated valves without employing an auxiliary valve. I do not depend upon the accuracy of the sliding fit of the convex surface of the valve in the valve chamber to prevent a loss or waste of motive fluid, except during the movement or travel of the valve. The admission and exhaust ports in the valve-casing which are connected with passages with the cylinder are alternately opened and closed by the convex sliding surfaces of the valve covering or lapping over the port openings, but when the valve is at the limit of its movement in either direction the supply of motive fluid to one end of the cylinder and the exhaust from the opposite end of the cylinder are sealed by the beveled seats of the valve bearing on the beveled seats of the valve-casing. When the valve is moving from one end of the valve-casing to the opposite end, the supply of fluid to one end of the cylinder is cut off by one portion of the convex surface of the valve before the exhaust-port from said end of the cylinder is uncovered by another portion of the convex surface of the valve and the only waste of fluid through the exhaust ports is that which may leak past the convex surface during the movement of the valve, and this movement of the valve is very rapid.

The invention will be fully understood from the following description taken in connection with the accompanying drawings, and the novel features thereof are pointed out and clearly defined in the claims at the close of the specification.

In the drawings,—Figure 1 is a longitudinal sectional elevation showing part of a rock drill embodying the invention. The cylinder and piston are broken away and the other parts are not shown as they form no necessary part of the invention. Fig. 2 is an end view partly in section. Fig. 3 is a section on line 3—3 of Fig. 2.

The valve chest or casing is composed of three sections. The central section A is preferably made of cast metal and bolted to the cylinder in the usual or in any suitable manner and is provided with the cored out passages $A'$, $A^2$, communicating with passages $B^2$, $B^3$, leading respectively to opposite ends of the cylinder B and with the chambers $a'$, $a^2$ in the heads $A^3$, $A^4$ which are fitted to the central section A of the valve-casing. Said heads are preferably made of material which may be hardened to furnish durable seats for the valve. The central section A has an opening $A^9$ adapted to be connected with a source of fluid pressure supply and a passage $A^{11}$ communicates with the passages $A^{12}$, $A^{13}$ in the heads $A^3$, $A^4$ and permits fluid pressure to enter the annular chambers $A^{14}$, $A^{15}$ and to pass to the chamber $a'$, $a^2$ when the valve is in the proper position. The exhaust from the passages $a'$, $a^2$ passes therefrom to the chamber $A^{16}$ through chambers $A^{17}$, $A^{18}$ as shown in Fig. 3 and to the atmosphere through passage $A^{10}$. The heads $A^3$, $A^4$ are preferably provided with passages $A^{19}$, $A^{20}$ leading respectively from the annular chambers $A^{14}$, $A^{15}$ to each end of the valve-casing so that the motive fluid can pass to each end of the valve. The size or cross-section of these passages is determined by the manner in which the valve is to be operated. If the valve is to be wholly or partially actuated by fluid pressure, the size of the passages is made very small for the reason that will be hereinafter explained. If the valve is to be operated mechanically without being supplemented by fluid pressure, said passages $A^{19}$, $A^{20}$ are made of comparatively large cross-section so that the pressure on each end of the valve will equalize and not interfere with the rapid movement of the valve. The passages $A^{19}$, $A^{20}$ are preferably screw-threaded, or tapped, to receive the plugs $A^{21}$, $A^{22}$ which have small holes or passages $A^{23}$, $A^{24}$ passing through them and pin valves $A^{27}$, $A^{28}$ are provided by which the amount of fluid passing through the holes $A^{23}$, $A^{24}$ to each end of the valve may be regulated when the valve is to be wholly or partially actuated by fluid pressure, the pin valves being in threaded engagement with the plates $C'$, $C^2$ and having check nuts $A^{29}$, $A^{30}$.

The valve may be operated wholly by mechanical means by closing the pin valves $A^{27}$, $A^{28}$ as shown in Fig. 3, in which case there will be no fluid pressure on the ends of the valve except that which may pass by the convex surfaces of the portions $E'$, $E^3$ of the valve. To relieve this pressure, if any, the heads $A^3$, $A^4$ are provided with the passages J, $J'$, leading from the ends of the valve to the cylinder as shown at K, $K'$, which are, by the movements of the piston, alternately placed in communication with the chamber $A^{25}$ and through the passages $A^{26}$, $A^{16}$ and $A^{10}$ with the atmosphere, thus relieving any pressure on the proper end of the valve when it is in either position as hereafter more fully explained.

The passages J, $J'$, are screw threaded in the heads $A^3$, $A^4$, as shown clearly in Fig. 1 so that they may be plugged and communication from the end of the valve to the cylinder and to the atmosphere cut off. When the passages J, $J'$, are plugged, the plugs $A^{21}$, $A^{22}$ may be removed and the passages $A^{19}$, $A^{20}$ being of large area will permit the fluid to pass freely to and from the chambers at each end of the valve as it is shifted, and there will be no leak or waste of motive fluid and the valve will be operated wholly by mechanical means.

There are two seats $A^5$, $A^6$ in the head $A^3$ and two seats $A^7$, $A^8$ in the head $A^4$. The plates $C'$, $C^2$ are fitted respectively to either end of the valve-casing and the whole bolted together by the three bolts $D'$, $D^2$, $D^3$. The central section A is provided with the openings $A^9$, $A^{10}$, to which the fluid pressure supply and the exhaust connections may be made. The fluid pressure supply is preferably connected with the opening $A^9$ for the reason hereinafter explained, but when used for some types of engines, the motion thereof may be reversed by admitting fluid at $A^{10}$ and exhausting at $A^9$. A passage $A^{11}$ is preferably cored through one side of the section A, as shown in Fig. 3, connecting with passages $A^{12}$, $A^{13}$ in the heads $A^3$, $A^4$, and communicating with the annular chambers $A^{14}$, $A^{15}$ therein. The passage $A^{10}$ communicates by means of the passage $A^{16}$ with the annular chambers $A^{17}$, $A^{18}$ in the central section A of the valve-casing.

The valve is formed in three parts $E'$, $E^2$, $E^3$, which are held in assembled position by the bolt $E^4$. These parts are preferably hardened, then assembled and ground true on the centers of the bolt $E^4$, using the latter as an arbor. The dowels $E^5$, $E^6$ serve to locate the parts of the valve in the same relation to each other when reassembling.

The valve is preferably provided with four bevel seating surfaces $E^7$, $E^8$, $E^9$, $E^{10}$, two of which bear on corresponding seats in the valve-casing and limit the travel of the valve in one direction, the other two bevel surfaces also bearing on corresponding seats in the valve-casing and limiting the travel of the valve in the opposite direction. When the valve is seated in one position, the supply of motive fluid to one end of the cylinder and the exhaust from the opposite end of the cylinder are cut off by the valve lapping over the ports which are also sealed by the beveled seats of the valve bearing on the beveled seats of the valve-casing. In this position of the valve, the exhaust to the first mentioned end of the cylinder and the supply of fluid to the opposite end of the cylinder is open. When the valve is seated in the opposite direction, the conditions are reversed and in either position of the valve there is no waste of motive fluid and the fluid can only pass to the desired end of the cylinder, since the exhaust passage therefrom is tightly sealed by the beveled seat of the valve and the supply of fluid to the other end of the cylinder is sealed by the other beveled seat of the valve.

The valve shown herein has pressure surfaces $E^{11}$, $E^{12}$, at each end, and when the ports $A^{19}$, $A^{20}$, are of sufficient cross-section, the plugs $A^{21}$, $A^{22}$, removed and passages J, J′ sealed, the surfaces $E^{11}$, $E^{12}$ are always subject to an equal fluid pressure tending to move the valve respectively in opposite directions. These pressure surfaces are preferably made of equal areas so that the pressure on one of said surfaces tending to move the valve in one direction will be balanced by the pressure on the other end of the valve tending to move it in the opposite direction.

With this arrangement of the passages $A^{19}$, $A^{20}$ there can be no waste of motive fluid past the convex sliding surfaces at the ends of the valve because when the valve is in either position, as for instance as shown in Fig. 3, the pressure in the annular chamber $A^{14}$ at the inner end of the convex sliding surface is equal to the pressure at the left hand side of the valve, and there is no tendency of the fluid at the left outer end of the valve to pass by said surface, and at the right side of the valve the pressure in the annular chamber $A^{15}$ at the inner end of the convex surface is equal to the pressure on the right outer end of the valve. It will be thus understood that the convex sliding surfaces of the valve serve to guide the valve to its seats and overlap the ports when the valve is moving from one position to the other but that the nicety of the fit of said surfaces and the wear thereof does not affect the efficiency of the valve to prevent the escape of motive fluid through the exhaust-ports when the valve has reached its seated position in either direction. While this arrangement of the passages $A^{19}$, $A^{20}$, is preferred in order to prevent any waste of fluid that may leak past the convex surfaces at the ends of the valve, it will be understood that said passages may be omitted and the opposite ends of the valve-casing connected by a communicating passage in any suitable manner. When the valve is to be operated wholly by mechanical means, the ends of the valve-casing may be open directly to the atmosphere, and the passages $A^{19}$, $A^{20}$, closed tightly by suitable plugs. But in the latter case any fluid that may leak past the convex sliding surfaces at the ends of the valve will be wasted.

To assemble the valve in position in the valve-casing, the part $E^2$ is placed in position in the section A; the parts E′, $E^3$ are placed respectively in the heads $A^3$, $A^4$. The heads are placed in position on the section A and the bolt $E^4$ is then inserted through the parts of the valve and secured by the nut $E^{13}$, the end of the bolt being riveted over slightly to prevent the nut from unscrewing, or the bolt may be provided with a suitable lock-nut. The plates C′, $C^2$ are placed in position and secured by the bolts D′, $D^2$, $D^3$. The surfaces of the sections and plates are finished to bear evenly to prevent leakage. The seats of the valve and valve-casing may be lapped while in assembled position to bear perfectly.

The valve may be actuated in different ways. In the present instance I have shown an internally operated tappet or rocker-arm F pivotally mounted on the pin G secured in the cylinder B, said tappet being moved in opposite directions by the beveled shoulders H′, $H^2$ of the piston H. The tappet is provided on its upper side with a flexible extension F′ which engages the sides of an annular groove $E^{14}$ in the large diameter of the valve. The extension F′ is preferably formed integral with the tappet and is made with a cross-section that is adapted to form a spring or yielding connection between the valve and the piston.

One object of providing a yielding connection between the valve and the piston is to overcome the difficulty that would otherwise be experienced in adjusting and maintaining the throw or movement of the connection or tappet so that it would be exactly equal to the proper travel or the distance between the opposite seats of the valve-casing that is shown and described herein. It will be apparent that with a rigid connection a slight wear or lost motion would result in the valve not seating properly. By employing a yielding connection I am enabled to make the movement or throw of the connection somewhat greater than the travel of the valve and thereby provide for wear and lost motion that may occur from long service.

Another very important feature is that by providing a yielding connection in combination with the novel valve herein shown and described I am enabled to overcome the dead point in the travel of the piston with a mechanically operated valve as will be hereinafter described.

The recess $B^4$ in the wall of the cylinder is always in communication with the passage $A^{16}$ and the opening $A^{10}$ which as hereinbefore stated is preferably the exhaust opening. It will be apparent that the fluid pressure may be supplied through the opening $A^{10}$ and the exhaust be connected to the opening $A^9$ but in the latter case when the valve is seated in either position, there will be a comparatively large unbalanced area against which the motive fluid acts to hold the valve in seated position. When the motive fluid is supplied through the opening $A^9$, as in Fig. 3, and the valve is seated in either position, the unbalanced area is equal to the difference in area between the large and small diameters of the seat, being approximately equal to the area of the seat, and in practice it has been found that the power required to start the valve from its seat is a great deal less than the power required to move the unbalanced slide valves that are largely employed in apparatus of this character. As hereinbefore stated the pressure surfaces of the valve are preferably of equal area. When the valve is not in contact with its seat it is balanced. When seated in either direction the motive fluid tends to seat the valve and hold it in seated position. This is a very important feature and may be taken advantage of to determine the speed at which the valve travels from one position to the other independent of the speed at which the piston moves. With a tappet moved valve as ordinarily constructed and arranged, the speed at which the valve moves from one position to the other bears some fixed relation to the speed of the piston and the piston must have sufficient momentum to carry the valve past the dead point.

With the construction herein shown, when the tappet is moved by the piston, the flexible extension $F'$ tends to move the valve in the same direction in which the piston is moving, but the motive fluid tends to hold the valve to its seat, and the end of the extension lags behind the piston until the tension exerted on the valve is sufficient to start the latter from its seat. As soon as the valve moves, however, the motive fluid acts on the area that was previously seated and the valve is now balanced and moves freely so that the tension being exerted by the extension $F'$ snaps the valve over into the opposite position. The speed as which the valve moves from one position to the other may be varied by proportioning the cross-section of the extension $F'$ with relation to the area of the valve seats.

When the valve is wholly actuated by mechanical means, the operation is as follows: The piston being in the position shown in Fig. 1, the motive fluid is supplied through the opening $A^9$ and passes by the surface $E^7$ of the valve to the passages $a'$, $A'$ in the valve-casing to the passage $B^2$ leading to the left hand side of the cylinder to move the piston in the opposite direction. The exhaust fluid from the right hand end of the cylinder passes through the passage $B^3$ in the wall of the cylinder into the passages $A^2$, $a^2$, in the valve-casing and past the surface $E^9$ of the valve into the passage $A^{16}$ and out through the opening $A^{10}$. When the fluid pressure is being supplied to the passage $A'$, it is prevented from escaping to the exhaust passages by the bevel seat $E^8$ of the valve and the motive fluid is prevented from escaping to the passage $A^2$ by the bevel seat $E^{10}$ of the valve. The valve is held against said beveled seats by the pressure of fluid against the unbalanced area of the seat $E^7$. When the shoulder $H'$ of the piston comes into contact with the left hand end of the tappet and moves the latter, the tension of the extension $F'$ overcomes the resistance of the fluid pressure holding the valve to its seat and the position of the valve is reversed. The motive fluid will now be supplied past the surface $E^{10}$ of the valve to the passages $a^2$, $A^2$ and $B^3$ to the right hand end of the cylinder to drive the piston in the opposite direction. The exhaust fluid from the left hand end of the cylinder will escape through the passages $B^2$, $A'$, $a^2$ past the surface $E^8$ of the valve to the passage $A^{16}$ and through the opening $A^{10}$. The escape of fluid to the exhaust passages is meantime prevented by the surfaces $E^7$ and $E^9$ of the valve. The valve is held in seated position by pressure on the unbalanced area of the surface $E^{10}$ of the valve. When the shoulder $H^2$ of the piston comes into contact with the right hand end of the tappet, the valve will be moved to the position shown in Fig.1.

By providing the cylinder with the ports $K$, $K'$ connected respectively with opposite ends of the valve-casing by the passages represented by the dotted lines $J$, $J'$, the valve may be operated wholly or partially by fluid pressure. In the latter case the pressure on one end of the valve, that is in excess of the pressure of the opposite end of the valve will assist or supplement the action of the tappet to move the valve.

As hereinbefore stated, the passages $A^{23}$, $A^{24}$ are of small diameter. This is necessary in order to prevent a waste of fluid when either end of the valve is open to the chamber $A^{16}$ through the passage $J$ or $J'$. The operation is the same as is usual with fluid actuated valves having pressure surfaces of equal area to which the motive fluid is constantly admitted. The pressure is exhausted from one end of the valve to allow the pressure on the other end to move the valve. When the piston is in the position shown in Fig. 1 the port K is uncovered and the fluid from the left hand side of the valve is free to exhaust into the space $A^{16}$ being in communication through $B^4$, $A^{25}$, $A^{26}$. The port K' being covered by the piston, the fluid supplied to the right hand end of the valve through the small passage $A^{24}$ is prevented from escaping and its pressure is exerted upon said end to move the valve to the left hand side of the valve-casing. When the piston moves toward the right hand side of the cylinder, the port K is covered to prevent the escape of fluid and the port K' is uncovered allowing the escape of fluid whereby the valve is moved toward the right hand side of the casing. The ports are arranged so that when the shoulder H' of the piston engages the left side of the tappet, the shoulder $H^2$ of the piston will be passing over the port K' to allow the escape of fluid. When the shoulder $H^2$ engages the right side of the tappet the shoulder H' will be passing over the port K to allow the escape of fluid. It will be understood that when the piston engages the tappet to move the valve in either direction the fluid will be exhausted from one end of the valve and the fluid pressure on the opposite end of the valve will assist the tappet to move the valve in the required direction. It will be seen that the tappet has very little work to do, which is a great advantage when employed in connection with a rapidly moving piston. The tappet serves, however, to control the movement of the valve and prevent the delayed or irregular opening and closing of the ports through which the motive fluid is supplied and exhausted which is common with fluid actuated valves.

In ordinary piston valves the pressure surfaces against which the motive fluid acts to balance the valve or in some types to move the valve in opposite directions, do not act directly to close or seal the admission and exhaust-ports, and the efficiency of the valve varies according to the nicety of the fit of cylindrical or convex sliding surfaces of the valve in the bore of the valve-casing when covering or lapping over the ports leading from the valve-casing to opposite ends of the cylinder or to the exhaust-ports connected with the atmosphere. With the valve herein shown the pressure surfaces also act to seal the admission and exhaust ports and the efficiency of the valve when in seated position in either direction does not depend on the fit of the convex bearing surfaces, but upon the accurate timing and bearing of the pressure surfaces on the corresponding seats of the valve-casing, the contacting surfaces respectively limiting the travel of the valve in opposite directions.

It will be understood that the pressure surfaces which limit the travel of the valve and against which the motive fluid acts to alternately press the valve in opposite directions do not coöperate with the fluid pressure to actuate the valve. The action of the fluid on said surfaces does not tend to move the valve but to resist its movement or press it in the opposite direction, when one of said surfaces is subject to fluid pressure and the opposing surface is not subject to such pressure. The valve is at the limit of its movement at this time and cannot move in the direction in which the fluid pressure tends to move it. As soon as the valve moves in the opposite direction, one of the opposing surfaces will present an equal area and the opposing surfaces are now balanced by the fluid acting on equal areas and the fluid does not tend to move the valve.

I claim as my invention:

1. In apparatus of the character described, a cylinder and piston, a valve-casing having ports through which motive fluid is supplied to the respective ends of the cylinder, a valve having sliding bearing surfaces fitting the bore of the valve-casing which alternately overlap and uncover said ports to admit motive fluid to opposite sides of the piston, said valve having also other surfaces which act to prevent the passage of fluid through said ports.

2. In apparatus of the character described, a cylinder and piston, a valve-casing having two sets of ports communicating with passages leading to the cylinder through which the motive fluid is supplied to and exhausted from the respective ends of the cylinder, a valve having sliding bearing surfaces which alternately overlap and uncover said ports to admit and exhaust fluid to and from opposite sides of the piston, said valve having also other surfaces which act to prevent the passage of fluid through said ports.

3. In apparatus of the character described, a cylinder and piston, a valve-casing having passages communicating respectively with opposite ends of the cylinder, said passages communicating respectively with two sets of ports in the valve-casing, a valve having sliding bearing surfaces which alternately overlap and uncover said ports to admit and exhaust fluid to and from opposite sides of the piston, said valve having also other surfaces which act to prevent the passage of fluid through said ports.

4. In apparatus of the character described, a cylinder and piston, a valve-casing having passages communicating respectively with opposite ends of the cylinder, and provided with ports communicating with the respective passages, a valve having sliding bearing surfaces which alternately overlap and uncover said ports to admit motive fluid to opposite ends of the cylinder, the ports communicating with one end of the cylinder being covered by the sliding surfaces of the valve before the ports communicating with the opposite end are uncovered, said valve having other surfaces which act to prevent the passage of fluid through said ports.

5. In apparatus of the character described, a cylinder and piston, a valve-casing having passages communicating respectively with opposite ends of the cylinder, and provided with ports communicating with the respective passages, a valve having sliding bearing surfaces which alternately overlap and uncover said ports to exhaust the fluid from opposite ends of the cylinder, the ports communicating with one end of the cylinder being covered by the sliding surfaces before the ports communicating with the opposite end are uncovered, the valve having other surfaces which act to prevent the passage of fluid through said ports.

6. In apparatus of the character described, a cylinder and piston, a valve-casing having passages communicating respectively with opposite ends of the cylinder, said passages communicating respectively with two sets of ports in the valve-casing through one set of which the fluid is supplied to and exhausted from the respective ends of the cylinder, a valve having sliding bearing surfaces which control said ports, the ports through which the fluid is supplied being closed by the sliding surfaces of the valve before the exhaust ports are uncovered, the valve having other surfaces which respectively limit the travel of the valve in opposite directions and act to prevent the escape of fluid past the sliding bearing surfaces of the valve.

7. In apparatus of the character described, a cylinder and piston, a valve-casing having ports through which motive fluid is supplied to the respective ends of the cylinder, a valve having opposing pressure surfaces against which the motive fluid acts tending to press the valve in opposite directions and provided with sliding bearing surfaces which alternately overlap and uncover said ports, said valve having annular surfaces which also act to prevent the passage of fluid respectively through said ports.

8. In apparatus of the character described, a cylinder and piston, a valve-casing having two sets of ports communicating with passages leading to the cylinder through which the motive fluid is supplied to and exhausted from the respective ends of the cylinder, a valve having opposing pressure surfaces against which the motive fluid acts tending to press the valve in opposite directions and provided with sliding bearing surfaces which alternately overlap and uncover said ports, said valve having annular surfaces intermediate the ends of the valve which also act alternately to prevent the passage of fluid respectively through said ports.

9. In apparatus of the character described, a cylinder and piston, a valve-casing having passages communicating respectively with opposite ends of the cylinder, each of said passages communicating respectively with two ports in the valve-casing through one of which the fluid is supplied to and through the other of which the fluid is exhausted from the respective end of the cylinder, a valve having opposing pressure surfaces against which the motive fluid acts tending to press the valve in opposite directions and provided with sliding bearing surfaces which control said ports, the ports through which the fluid is supplied being closed by the sliding surfaces of the valve before the exhaust ports are uncovered, said pressure surfaces acting to respectively limit the travel of the valve in opposite directions and to prevent the escape of fluid past the sliding bearing surfaces of the valve.

10. In apparatus of the character described, a cylinder and piston, a valve-casing having ports through which motive fluid is supplied to the respective ends of the cylinder, a valve having opposing pressure surfaces against which the motive fluid acts to press the valve in opposite directions and provided with sliding bearing surfaces which fit the bore of the valve-casing and alternately overlap and uncover said ports, said valve having also other surfaces which alternately act to prevent the passage of fluid through said ports.

11. In apparatus of the character described, a cylinder and piston, a valve-casing having two sets of ports through which motive fluid is supplied to and exhausted from the respective ends of the cylinder, a valve having opposing pressure surfaces against which the motive fluid acts to press the valve in opposite directions and provided with sliding bearing surfaces which alternately overlap and uncover said ports, said valve having also other surfaces which alternately act to prevent the passage of fluid through said ports.

12. In apparatus of the character described, a cylinder and piston, a valve-casing having passages communicating respectively with the opposite ends of the cylinder, said passages communicating with two sets of ports respectively in the valve-casing, a valve having opposing pressure surfaces against which the motive fluid acts to press the valve in opposite directions and provided with sliding bearing surfaces which alternately overlap and uncover said ports, said valve having also other surfaces which alternately act to prevent the passage of fluid through said ports.

13. In apparatus of the character described, a cylinder and piston, a valve-casing having passages communicating respectively with the opposite ends of the cylinder and provided with ports communicating with the respective passages, a valve having opposing pressure surfaces against which the motive fluid acts to press the valve in opposite directions and provided with sliding bearing surfaces which alternately overlap and uncover said ports to admit motive fluid to opposite ends of the cylinder, the ports communicating with one end of the cylinder being covered by the sliding surfaces of the valve before the ports communicating with the opposite end of the cylinder are uncovered, said valve having other surfaces which respectively limit the travel of the valve in opposite directions and act to prevent the escape of fluid past the sliding bearing surfaces of the valve.

14. In apparatus of the character described, a cylinder and piston, a valve-casing having passages communicating respectively with the opposite ends of the cylinder and provided with ports communicating with the respective passages, a valve having opposing pressure surfaces against which the motive fluid acts to press the valve in opposite directions and provided with sliding bearing surfaces which alternately overlap and uncover said ports to exhaust fluid from opposite ends of the cylinder, the ports communicating with one end of the cylinder being covered by the sliding surfaces of the valve before the port communicating with the opposite end of the cylinder is uncovered, the valve having other surfaces which respectively limit the travel of the valve in opposite directions and act to prevent the escape of fluid past the sliding bearing surfaces of the valve.

15. In apparatus of the character described, a cylinder and piston, a valve-casing having passages communicating respectively with the opposite ends of the cylinder, said passages communicating with two sets of ports respectively in the valve-casing, through one set of which the motive fluid is supplied to and exhausted from the respective ends of the cylinder, a valve having opposing pressure surfaces against which the motive fluid acts to move the valve in opposite directions and provided with sliding bearing surfaces which control said ports, the ports through which motive fluid is supplied being closed by the sliding surfaces of the valve before the exhaust-ports are uncovered, the valve having other surfaces which respectively limit the travel of the valve in opposite directions and act to prevent the escape of fluid past the sliding bearing surfaces of the valve.

16. In apparatus of the character described, a cylinder and piston, a valve-casing having ports through which motive fluid is supplied to the respective ends of the cylinder, a valve having sliding bearing surfaces which fit the bore of the valve-casing and alternately overlap and uncover said ports, the valve having pressure surfaces which respectively limit the travel of the valve in opposite directions and act to prevent the escape of fluid past the sliding bearing surfaces of the valve, and means independent of said pressure surfaces for actuating the valve.

17. In apparatus of the character described, a cylinder and piston, a valve-casing having two sets of ports through which motive fluid is supplied to and exhausted from the respective ends of the cylinder, a valve having sliding bearing surfaces which alternately overlap and uncover said ports, the valve having pressure surfaces which respectively limit the travel of the valve in opposite directions and act to prevent the escape of fluid past the sliding bearing surfaces of the valve, and means independent of said pressure surfaces for actuating the valve.

18. In apparatus of the character described, a cylinder and piston, a valve-casing having passages communicating respectively with opposite ends of the cylinder, said passages communicating respectively with two sets of ports in the valve-casing, a valve having sliding bearing surfaces which alternately overlap and uncover said ports, the valve having pressure surfaces which respectively limit the travel of the valve in opposite directions and act to prevent the escape of fluid past the sliding bearing surfaces of the valve, and means independent of said pressure surfaces for actuating the valve.

19. In apparatus of the character described, a cylinder and piston, a valve-casing having passages communicating respectively with opposite ends of the cylinder, said passages communicating respectively with two sets of ports in the valve-casing through one set of which the fluid is supplied to and exhausted from the respective ends of the cylinder, a valve having sliding bearing surfaces which control said ports, the ports through which the fluid is supplied being closed by the valve before the exhaust-ports are uncovered, said valve having pressure surfaces which respectively limit the travel of the valve in opposite directions and act to prevent the escape of fluid past the sliding bearing surfaces of the valve, and means independent of said pressure surfaces for actuating the valve.

20. In apparatus of the character described, a cylinder and piston, a valve-casing having two sets of ports through which the motive fluid is supplied to and exhausted from the respective ends of the cylinder, a valve having opposing pressure surfaces against which the motive acts to press the valve in opposite directions and provided with sliding bearing surfaces which fit the bore of the valve-casing and alternately overlap and uncover said ports, the valve having pressure surfaces which respectively limit the travel of the valve in opposite directions and act to prevent the escape of fluid past the sliding bearing surfaces of the valve, and means independent of said pressure surfaces for actuating the valve.

21. In apparatus of the character described, a cylinder and piston, a valve-casing having passages communicating respectively with opposite ends of the cylinder, said passages communicating with two sets of ports in the valve-casing through which the motive fluid is respectively supplied to and exhausted from the cylinder, a valve having bearing surfaces sliding in the bore of the valve-casing which alternately overlap and uncover said ports and other surfaces which respectively limit the travel of the valve in opposite directions and act to prevent the escape of fluid past the sliding bearing surfaces of the valve.

22. In apparatus of the character described, a cylinder and piston, a valve-casing having passages communicating respectively with opposite ends of the cylinder, said passages communicating with two sets of ports in the valve casing through which the motive fluid is respectively supplied to and exhausted from the cylinder, a valve having bearing surfaces sliding in the bore of the valve-casing which alternately overlap and uncover said ports, the valve having opposing pressure surfaces against which the motive fluid alternately acts tending to press the valve in opposite directions and hold it in seated position, said opposing surfaces acting respectively to limit the travel of the valve in opposite directions and to prevent the escape of fluid past the sliding bearing surfaces of the valve.

23. In apparatus of the character described, a cylinder and piston, a valve-casing having ports communicating respectively with opposite ends of the cylinder, a valve having sliding bearing surfaces movable in said casing which alternately overlap and uncover the ports for controlling the admission of motive fluid through said ports to operate the piston, said valve having opposing pressure surfaces intermediate the ends of the valve against one of which the motive fluid acts tending to press the valve in one direction and hold the opposite surface in seated position and when the valve is at the end of its movement in the opposite direction the motive fluid acting against said opposite surface to press the first mentioned surface in seated position, said pressure surfaces respectively limiting the travel of the valve in opposite directions, and means controlled by the movements of the piston for actuating the valve.

24. In apparatus of the character described, a cylinder and piston, a valve-casing having ports communicating respectively with opposite ends of the cylinder, a valve having sliding bearing surfaces movable in said casing which alternately overlap and uncover the ports for controlling the admission of motive fluid through said ports to operate the piston, said valve having opposing pressure surfaces against one of which the motive fluid acts tending to press the valve in one direction and hold the opposite surface in seated position and when the valve is at the end of its movement in the opposite direction the motive fluid acting against said opposite surface to press the first mentioned surface in seated position, said pressure surfaces respectively limiting the travel of the valve in opposite directions, the contacting surfaces which limit the travel of the valve acting to prevent the admission of motive fluid respectively to opposite ends of the cylinder, and means independent of said pressure surfaces for actuating the valve.

25. In apparatus of the character described, a cylinder and piston, a valve-casing, a valve having sliding bearing surfaces movable in said casing for controlling the movements of the piston, said valve-casing having ports and passages communicating respectively with opposite ends of the cylinder, said ports and passages being alternately cut off from communication with fluid pressure supply and with exhaust passages in the valve-casing by said sliding bearing surfaces on reciprocation of the valve which alternately overlap and uncover the ports, the motive fluid acting alternately on opposing pressure surfaces of the valve, tending to maintain it in seated position at each end of its movement, said opposing pressure surfaces of the valve abutting against internal shoulders in the valve-casing to respectively limit the travel of the valve in opposite directions and respectively prevent the admission of motive fluid to opposite ends of the cylinder.

26. In apparatus of the character described, a cylinder and piston, a valve-casing, a valve movable in said casing, said valve having sliding convex bearing surfaces which fit the bore of the valve-casing, said valve-casing being provided with inlet ports and with ports in communication respectively with opposite ends of the cylinder, the sliding convex bearing surfaces of the valve alternately overlapping and uncovering the inlet ports to the bore of the valve-casing, the valve having annular surfaces which respectively limit the travel of the valve in opposite directions, the contacting surfaces which limit the travel of the valve also acting to prevent the passage of fluid through said ports.

27. In apparatus of the character described, a cylinder and piston, a valve-casing, a valve movable in said casing, said valve having sliding convex bearing surfaces, said valve-casing being provided with inlet ports and exhaust ports, the valve-casing having ports which are in communication respectively with opposite ends of the cylinder, the sliding convex bearing surfaces of the valve alternately overlapping and uncovering the inlet and exhaust-ports to the bore of the valve-casing, one set of ports being closed by the valve before the other set of ports are uncovered, the valve having annular surfaces which limit the travel of the valve respectively in opposite directions, the contacting surfaces which limit the travel of the valve also acting to prevent the passage of fluid through said inlet and exhaust-ports.

28. In apparatus of the character described, a cylinder and piston, a valve-casing, a valve movable in said casing and having convex bearing surfaces, said valve-casing being provided with inlet and exhaust-ports, the convex bearing surfaces of the valve alternately overlapping and uncovering said ports to the bore of the valve-casing when the valve moves from one position to the other, said ports being arranged so that in the intermediate position of the valve the ports will be closed, said valve having annular surfaces intermediate of the ends of the valve which also act to prevent the passage of fluid through said ports.

29. In apparatus of the character described, a cylinder and piston, a valve-casing, a valve movable in said casing and having convex bearing surfaces, said valve-casing being provided with inlet and exhaust-ports, the convex bearing surfaces of the valve alternately overlapping and uncovering said ports to the bore of the valve-casing when the valve moves from one position to the other, said valve having annular surfaces which respectively limit the travel of the valve in opposite directions, the contacting surfaces which limit the travel of the valve acting alternately to prevent the passage of fluid through said ports.

30. In apparatus of the character described, a cylinder and piston, a valve-casing, a valve movable in said casing, and having convex bearing surfaces, said valve-casing being provided with inlet and exhaust-ports, the convex bearing surfaces of the valve alternately overlapping and uncovering said ports to the bore of the valve-casing when the valve moves from one position to the other, said ports being arranged so that they are closed when the valve is at the intermediate point of its travel, said valve having beveled surfaces which limit the travel of the valve respectively in opposite directions, the contacting surfaces of the valve acting alternately to prevent the passage of fluid through said ports.

31. In apparatus of the character described, a cylinder and piston, a valve casing, a valve movable in said casing and having convex bearing surfaces, said valve casing being provided with inlet and exhaust ports, the convex bearing surfaces of the valve alternately overlapping and uncovering said ports to the bore of the valve casing when the valve moves from one position to the other, said valve having annular surfaces which respectively limit the travel of the valve in opposite directions, the contacting surfaces which limit the travel of the valve acting to prevent the escape of fluid that may leak past the convex bearing surfaces of the valve when the latter is in seated position and means independent of said annular surfaces for actuating the valve.

32. In apparatus of the character described, a cylinder and piston, a valve casing, a valve movable in said casing, and having convex bearing surfaces, said valve casing being provided with inlet and exhaust ports, the convex bearing surfaces of the valve alternately overlapping and uncovering said ports to the bore of the valve casing when the valve moves from one position to the other, said ports being arranged so that they are closed when the valve is at the intermediate point of its travel, said valve having beveled surfaces which limit the travel of the valve respectively in opposite directions, the contacting surfaces of the valve acting to prevent the escape of fluid that may leak past the convex bearing surfaces of the valve when the latter is in seated position and means independent of said beveled surfaces for actuating the valve.

33. In apparatus of the character described, a cylinder and piston, a valve casing, a valve movable in said casing and having convex bearing surfaces, said valve casing being provided with inlet and exhaust ports, the convex bearing surfaces of the valve alternately overlapping and uncovering said ports to the bore of the valve casing when the valve moves from one position to the other, said valve having annular surfaces which respectively limit the travel of the valve in opposite directions, the contacting surfaces which limit the travel of the valve acting to prevent the escape of fluid that may leak past the convex bearing surfaces of the valve when the latter is in seated position and means for mechanically operating said valve.

34. In apparatus of the character described, a cylinder and piston, a valve casing, a valve movable in said casing, and having convex bearing surfaces, said valve casing being provided with inlet and exhaust ports, the convex bearing surfaces of the valve alternately overlapping and uncovering said ports to the bore of the valve casing when the valve moves from one position to the other, said ports being arranged so that they are closed when the valve is at the intermediate point of its travel, said valve having beveled surfaces which limit the travel of the valve respectively in opposite directions, the contacting surfaces of the valve acting to prevent the escape of fluid that may leak past the convex bearing surfaces of the valve when the latter is in seated position and means controlled by the movements of the piston for mechanically operating said valve.

In testimony whereof I affix my signature, in presence of two witnesses.

GEORGE L. BADGER.

Witnesses:
WILLIAM A. COPELAND,
ALVIE TARR.

Copies of this patent may be obtained for five cents each, by addressing the "Commissioner of Patents, Washington, D. C."